(12) United States Patent
Tsuzuki et al.

(10) Patent No.: US 11,536,326 B2
(45) Date of Patent: Dec. 27, 2022

(54) CLUTCH CONTROL DEVICE AND HYDRAULIC EQUIPMENT CONTROL DEVICE

(71) Applicant: HONDA MOTOR CO., LTD., Tokyo (JP)

(72) Inventors: Ryohei Tsuzuki, Wako (JP); Junya Ono, Wako (JP); Tatsuya Ryuzaki, Wako (JP); Hiroaki Uchisasai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 17/270,062

(22) PCT Filed: Jul. 2, 2019

(86) PCT No.: PCT/JP2019/026266
§ 371 (c)(1),
(2) Date: Feb. 22, 2021

(87) PCT Pub. No.: WO2020/039757
PCT Pub. Date: Feb. 27, 2020

(65) Prior Publication Data
US 2021/0324924 A1    Oct. 21, 2021

(30) Foreign Application Priority Data

Aug. 24, 2018    (JP) .............................. JP2018-157734

(51) Int. Cl.
*F16D 48/02*    (2006.01)
*B62M 25/08*    (2006.01)
(Continued)

(52) U.S. Cl.
CPC ............. *F16D 48/02* (2013.01); *B62M 25/08* (2013.01); *F15B 15/20* (2013.01); *F15B 21/044* (2013.01);
(Continued)

(58) Field of Classification Search
CPC ....................... F15B 21/044; F16D 2048/0257
See application file for complete search history.

(56) References Cited

U.S. PATENT DOCUMENTS

| 2003/0056640 A1 | 3/2003 | Yamasaki et al. |
| 2016/0245399 A1* | 8/2016 | Watanabe ........... F16H 61/0276 |
| 2017/0268587 A1 | 9/2017 | Ono et al. |

FOREIGN PATENT DOCUMENTS

| EP | 3228876 | 10/2017 |
| JP | 11-241734 | 9/1999 |

(Continued)

OTHER PUBLICATIONS

Indian Office Action for Indian Patent Application No. 202117011773 dated Sep. 23, 2021.
(Continued)

*Primary Examiner* — Stacey A Fluhart
(74) *Attorney, Agent, or Firm* — Amin, Turocy & Watson, LLP

(57) ABSTRACT

This clutch control device includes an engine (13), a transmission (21), a clutch device (26) configured to connect and disconnect motive power transmission between the engine (13) and the transmission (21), a clutch actuator (50) configured to drive the clutch device (26) and change a clutch capacity, a hydraulic circuit (63) provided between the clutch device (26) and the clutch actuator (50), an air bleeding device (64) configured to perform air bleeding of the hydraulic circuit (63), a control unit (60) configured to calculate a control target value of the clutch capacity, a
(Continued)

control mode changeover switch (59) configured to enable a control mode of the control unit (60) to be switched to an air bleeding mode, and an air bleeding switch (65) configured to enable a hydraulic pressure of the hydraulic circuit (63) to increase in the air bleeding mode.

10 Claims, 10 Drawing Sheets

(51) Int. Cl.
  *F15B 15/20* (2006.01)
  *F15B 21/044* (2019.01)
  *F16D 25/12* (2006.01)
(52) U.S. Cl.
  CPC ...... *F16D 25/12* (2013.01); *F16D 2048/0257* (2013.01); *F16D 2048/0263* (2013.01); *F16D 2048/0266* (2013.01)

(56) References Cited

FOREIGN PATENT DOCUMENTS

| | | | | |
|---|---|---|---|---|
| JP | 2003-097516 | | 4/2003 | |
| JP | 2011-149490 | | 8/2011 | |
| JP | 2013-036485 | | 2/2013 | |
| JP | 2013-057404 | | 3/2013 | |
| JP | 2013092168 A | * | 5/2013 | ............ F16D 25/14 |
| JP | 2017-166686 | | 9/2017 | |
| WO | 2010/121855 | | 10/2010 | |
| WO | WO-2011092492 A1 | * | 8/2011 | ............ F16D 21/06 |

OTHER PUBLICATIONS

Extended European Search Report for European Patent Application No. 19852025.6 dated Sep. 30, 2021.
International Search Report and Written Opinion for International Application No. PCT/JP2019/026266 dated Jul. 30, 2019, 9 pages.

\* cited by examiner

CLUTCH CONTROL DEVICE AND HYDRAULIC EQUIPMENT CONTROL
DEVICE

TECHNICAL FIELD

The present invention relates to a clutch control device and a hydraulic equipment control device.

The present application claims priority based on Japanese Patent Application No. 2018-157734 filed on Aug. 24, 2018, the contents of which are incorporated herein by reference.

BACKGROUND ART

In recent saddle-riding type vehicles, a clutch-by-wire system for enabling disconnection and connection operations of a clutch device to be performed according to electrical control by providing an actuator between the clutch device and a clutch operating element such as a clutch lever and driving and controlling the actuator in accordance with an operation input to the clutch operating element has been proposed.

RELATED ART DOCUMENT

Patent Document

Patent Document 1: Japanese Unexamined Patent Application, First Publication No. 2013-057404

SUMMARY

Problems to be Solved by the Invention

Incidentally, in the above-described conventional technology, a hydraulic circuit is formed between the clutch device and the actuator, but there is no specific disclosure about air bleeding within the hydraulic circuit.

In the case of an existing clutch system in which the clutch device and the clutch lever are directly connected by the hydraulic circuit without involving the actuator, an operator operates the clutch lever to increase a pressure of the hydraulic circuit and bleed air. Also, likewise, a determination of completion of air bleeding is performed by the operator operating the clutch lever and searching for a degree of pressurization with the feeling of his or her hand operating the clutch lever while iterating the pressurization and depressurization of the hydraulic circuit.

However, in the case of the clutch-by-wire system, an air bleeding operation similar to that of the existing system is difficult because the actuator is interposed between the clutch lever and the clutch device. In particular, even if the load of the actuator is increased while the air is trapped, a desired hydraulic pressure is not reached, so that the actuator may be overloaded. Also, it is not possible to determine the completion of air bleeding according to the feeling of the operation on the clutch lever.

An objective of the present invention is to facilitate an air bleeding operation of a hydraulic circuit in a clutch control device and a hydraulic equipment control device for operating hydraulic equipment such as a clutch device via an actuator.

Means for Solving the Problem

As the solution to the above-described problems, aspects of the present invention have the following configurations.

(1) According to a first aspect of the present invention, there is provided a clutch control device including: an engine; a transmission; a clutch device configured to connect and disconnect motive power transmission between the engine and the transmission; a clutch actuator configured to drive the clutch device and change a clutch capacity; a hydraulic circuit provided between the clutch device and the clutch actuator; an air bleeding device configured to perform air bleeding of the hydraulic circuit; a control unit configured to calculate a control target value of the clutch capacity; a control mode changeover switch configured to enable a control mode of the control unit to be switched to an air bleeding mode; and an air bleeding switch configured to enable a hydraulic pressure of the hydraulic circuit to increase in the air bleeding mode.

(2) In the clutch control device according to the above-described (1), the clutch actuator may maintain the hydraulic pressure after increasing the hydraulic pressure to a predetermined hydraulic pressure in the air bleeding mode.

(3) In the clutch control device according to the above-described (2), the clutch actuator may decrease the hydraulic pressure to a predetermined second specified value after increasing the hydraulic pressure to a predetermined first specified value in the air bleeding mode.

(4) In the clutch control device according to the above-described (1), the clutch actuator may stop an increase in the pressure when the hydraulic pressure has not increased to a predetermined first specified value within a predetermined specified time period in the air bleeding mode.

(5) In the clutch control device according to any one of the above-described (1) to (4), the control mode changeover switch may enable the control mode of the control unit to be switched to an air bleeding completion check mode.

(6) In the clutch control device according to the above-described (5), the control unit may determine completion of air bleeding when the hydraulic pressure has increased from a predetermined first determination value to a predetermined second determination value within a predetermined check determination time period in the air bleeding completion check mode.

(7) According to a second aspect of the present invention, there is provided a hydraulic equipment control device including: a hydraulic equipment configured to be operated with a hydraulic pressure which is supplied; an actuator configured to supply the hydraulic pressure to the hydraulic equipment and operate the hydraulic equipment; a hydraulic circuit provided between the hydraulic equipment and the actuator; an air bleeding device configured to perform air bleeding of the hydraulic circuit; a control unit configured to control an amount of hydraulic pressure supply from the actuator; a control mode changeover switch configured to enable a control mode of the control unit to be switched to an air bleeding mode; and a boost switch configured to enable the hydraulic pressure of the hydraulic circuit to increase when the control mode has been switched to the air bleeding mode.

(8) The hydraulic equipment control device according to the above-described (7) may further include a buck switch configured to enable the hydraulic pressure of the hydraulic circuit to decrease when the control mode has been switched to the air bleeding mode.

Advantage of the Invention

According to the clutch control device described in the above-described (1) of the present invention, it is possible to set the air bleeding mode in the control unit of a clutch-bywire system, increase the hydraulic pressure of the hydraulic circuit in the air bleeding mode, and perform an air bleeding operation according to an operation on the air bleeding switch. That is, it is possible to drive the clutch actuator and perform the air bleeding operation on the premise of trapping of air, as compared with a case in which the hydraulic pressure of the hydraulic circuit is increased with normal control. Thus, it is possible to facilitate the air bleeding operation while minimizing the overload of the clutch actuator.

According to the clutch control device described in the above-described (2) of the present invention, it is possible to suitably perform air bleeding in the hydraulic circuit by discharging a fluid in a state in which the hydraulic pressure has increased.

According to the clutch control device described in the above-described (3) of the present invention, it is possible to maintain a predetermined hydraulic pressure in consideration of an influence of friction of a master cylinder by decreasing the hydraulic pressure to the second specified value after the hydraulic pressure of the hydraulic circuit is increased to the first specified value. Thus, the drive load of the clutch actuator can be minimized.

According to the clutch control device described in the above-described (4) of the present invention, it is possible to minimize the overload of the clutch actuator because an increase in the pressure by the clutch actuator is stopped on the assumption that there is trapping of air within the hydraulic circuit when the hydraulic pressure of the hydraulic circuit has not increased to the first specified value. That is, when there is a lot of air within the hydraulic circuit, the predetermined hydraulic pressure is not reached even if a large load is applied to the actuator. At this time, the increase in the hydraulic pressure is stopped, so that the load applied to the actuator can be limited and the actuator can be protected.

According to the clutch control device described in the above-described (5) of the present invention, after the air bleeding operation is performed in the air bleeding mode, the control mode is switched to the air bleeding completion check mode and it is checked whether or not the air bleeding has been completed, so that the completion of the air bleeding can also be determined regardless of an operation on the clutch lever in a clutch-by-wire system in which a clutch actuator is interposed in a hydraulic circuit.

According to the clutch control device described in the above-described (6) of the present invention, the presence or absence of a delay of an increase in the hydraulic pressure due to trapping of air is determined according to whether or not the hydraulic pressure has passed through a hydraulic pressure area from the first determination value to the second determination value within the predetermined check determination time period. Thereby, it is possible to determine the completion of air bleeding regardless of the feeling of the operation on the clutch lever.

According to the hydraulic equipment control device described in the above-described (7) of the present invention, it is possible to set the air bleeding mode in the control unit of the hydraulic equipment control device, increase the hydraulic pressure of the hydraulic circuit in the air bleeding mode according to an operation on the boost switch, and perform an air bleeding operation. That is, it is possible to drive the actuator and perform the air bleeding operation on the premise of trapping of air, as compared with a case in which the hydraulic pressure of the hydraulic circuit is increased with normal control. Thus, it is possible to facilitate the air bleeding operation while minimizing the overload of the actuator.

According to the hydraulic equipment control device described in the above-described (8) of the present invention, it is possible to decrease the hydraulic pressure of the hydraulic circuit according to a manual operation and therefore it is possible to improve a degree of freedom of the air bleeding operation.

DESCRIPTION OF THE EMBODIMENTS

Hereinafter, embodiments of the present invention will be described with reference to the drawings. Also, in the following description, forward, rearward, left, and right directions and the like are the same as those in a vehicle to be described below unless otherwise mentioned. Also, an arrow FR indicating a forward direction with respect to the vehicle, an arrow LH indicating a left direction with respect to the vehicle, and an arrow UP indicating an upward direction with respect to the vehicle are shown in appropriate places in drawings used in the following description.

<Whole Vehicle>

Figure 1:
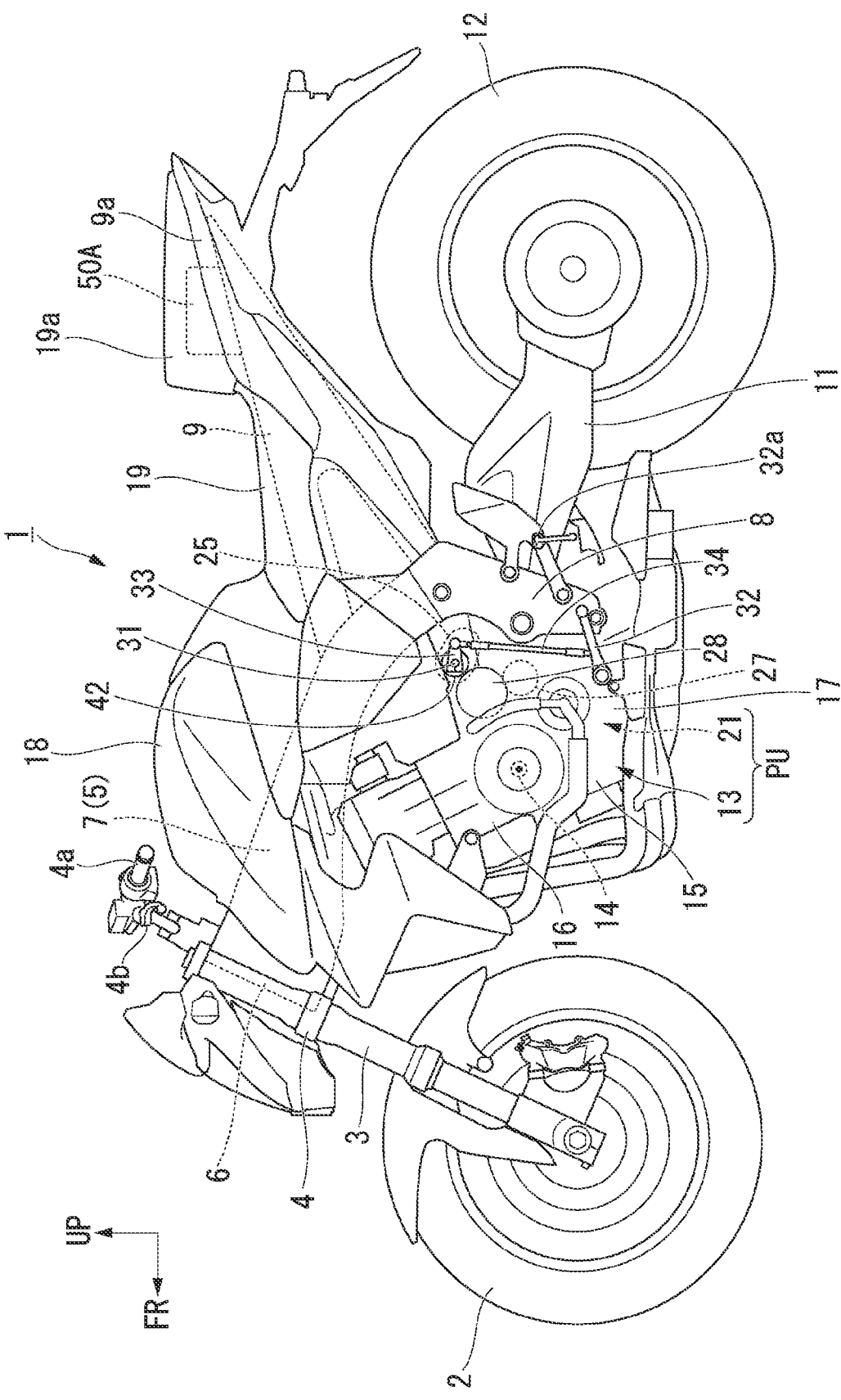
FIG. 1 is a left side view of a motorcycle according to an embodiment of the present invention.

As illustrated in FIG. 1, the present embodiment is applied to a motorcycle 1 that is an example of a saddle riding-type vehicle. A front wheel 2 of the motorcycle 1 is supported by lower ends of one pair of left and right front forks 3. Upper parts of the left and right front forks 3 are supported by a head pipe 6 of a front end of a vehicle body frame 5 via a steering stem 4. A bar-type steering handle 4a is mounted on a top bridge of the steering stem 4.

The vehicle body frame 5 includes the head pipe 6, main tubes 7 that extend downward and rearward from the head pipe 6 at the center in a vehicle width direction (a left/right direction), left and right pivot frames 8 connected in the downward direction of a rear end of the main tubes 7 and a seat frame 9 connected in the rearward direction of the main tubes 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

In the upward direction of the left and right main tubes 7, a fuel tank 18 is supported. In the upward direction of the seat frame 9 in the rearward direction of the fuel tank 18, a front seat 19 and a rear seat cover 19a are aligned in front of and behind each other and supported. The periphery of the seat frame 9 is covered with a rear cowl 9a. In the downward direction of the left and right main tubes 7, a power unit PU that is a motor of the motorcycle 1 is suspended. The power unit PU is linked with the rear wheel 12, for example, via a chain-type transmission mechanism.

The power unit PU integrally includes an engine (an internal combustion engine and a motor) 13 positioned on a front side of the power unit PU and a transmission 21 positioned on a rear side of the power unit PU. The engine 13, for example, is a multiple cylinder engine in which a rotary shaft of a crank shaft 14 is aligned in the left/right direction (the vehicle width direction). The engine 13 raises a cylinder 16 above a front part of a crank case 15. A rear part of the crank case 15 is formed as a transmission case 17 that accommodates the transmission 21.

<Transmission>

Figure 2:
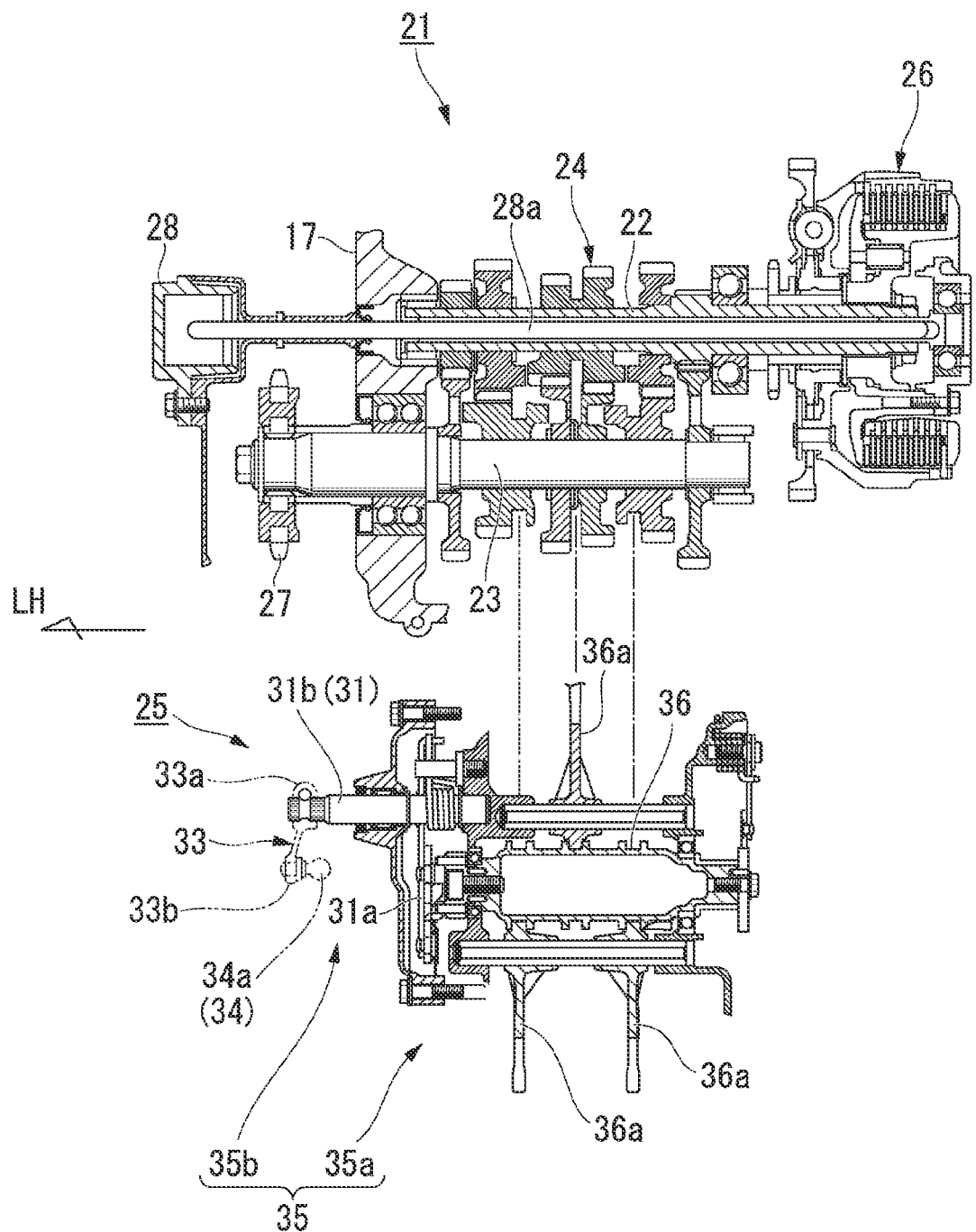
FIG. 2 is a cross-sectional view of a transmission and a change mechanism of the above-described motorcycle.

As illustrated in FIG. 2, the transmission 21 is a stepped transmission including a main shaft 22, a counter shaft 23, and a transmission gear group 24 disposed across both shafts 22 and 23. The counter shaft 23 constitutes an output shaft of the transmission 21 and the power unit PU. An end of the counter shaft 23 protrudes to the left side of a rear part of the crank case 15 and is connected to the rear wheel 12 via the chain-type transmission mechanism.

The transmission gear group 24 includes gears corresponding to the number of shift stages supported at both shafts 22 and 23. The transmission 21 is of a constant engagement type in which a pair of corresponding gears of the transmission gear group 24 are constantly engaged with each other between the shafts 22 and 23. A plurality of gears supported at both shafts 22 and 23 can be classified into a free gear that can rotate with respect to a corresponding shaft and a slide gear (a shifter) that is spline-fitted to a corresponding shaft. One of the free gear and the slide gear has a convex dog provided in an axial direction and the other has a concave slot provided in the axial direction so that the slot is engaged with the dog. That is, the transmission 21 is a so-called dog mission.

The main shaft 22 and the counter shaft 23 of the transmission 21 are disposed to be aligned in front of and behind each other in the rearward direction of the crank shaft 14. A clutch device (hydraulic equipment) 26 operated by a clutch actuator (an actuator) 50 (see FIG. 3) is coaxially disposed at a right end of the main shaft 22. The clutch device 26, for example, is a wet multiplate clutch and is a so-called normal open clutch. That is, the clutch device 26 reaches a connected state in which motive power transmission is enabled in accordance with the supply of a hydraulic pressure from the clutch actuator 50 and is returned to a disconnected state in which motive power transmission is disabled when there is no supply of the hydraulic pressure from the clutch actuator 50.

Rotation power of the crank shaft 14 is transmitted to the main shaft 22 via the clutch device 26 and is transmitted from the main shaft 22 to the counter shaft 23 via any gear pair of the transmission gear group 24. A drive sprocket 27 of the above-described chain-type transmission mechanism is attached to a left end of the counter shaft 23 that protrudes to the left side of a rear part of the crank case 15.

In the rearward and downward directions of the transmission 21, a change mechanism 25, which performs switching between gear pairs of the transmission gear group 24, is accommodated. The change mechanism 25 operates a plurality of shift forks 36a in accordance with the pattern of a lead groove formed on the outer periphery thereof in accordance with rotation of a shift drum 36 having a hollow cylindrical shape parallel to both shafts 22 and 23 and performs switching of a gear pair for use in motive power transmission between the shafts 22 and 23 in the transmission gear group 24.

The change mechanism 25 includes a shift spindle 31 parallel to the shift drum 36. At the time of rotation of the shift spindle 31, a shift arm 31a fixed to the shift spindle 31 rotates the shift drum 36, rotates the shift fork 36a in the axial direction in accordance with the pattern of the lead groove, and switches a gear pair in which motive power transmission is enabled within the transmission gear group 24 (i.e., switches a shift stage).

Referring also to FIG. 1, the shift spindle 31 causes a shaft outer part 31b to protrude to an outward side (in the left direction) of the crank case 15 in the vehicle width direction such that the change mechanism 25 is operable. A shift load sensor 42 (a shift operation detecting means) is coaxially attached to the shaft outer part 31b of the shift spindle 31. A swing lever 33 is attached to the shaft outer part 31b (or a rotation shaft of the shift load sensor 42) of the shift spindle 31. The swing lever 33 extends rearward from a base end part 33a that is fixed to the shift spindle 31 (or the rotation shaft) through clamp fixing and an upper end of a link load 34 is connected to a tip end part 33b thereof via an upper ball joint 34a so that it is freely swingable. A lower end of the link load 34 is connected to a shift pedal 32 that is operated by a driver using a foot via a lower ball joint (not illustrated) so that it is freely swingable.

As illustrated in FIG. 1, the shift pedal 32 has a front end supported at a lower part of the crank case 15 so that the shift pedal 32 is vertically swingable via a shaft in a left/right direction. A pedal part for hooking the driver's tiptoe placed on a step 32a is provided at a rear end of the shift pedal 32 and a lower end of the link load 34 is connected to a middle part in a front/back direction of the shift pedal 32.

As illustrated in FIG. 2, a shift change device 35, which includes the shift pedal 32, the link load 34, and the change mechanism 25 and performs gear switching of a gear shift step of the transmission 21, is configured. In the shift change device 35, an assembly (the shift drum 36, the shift forks 36a, and the like), which switches a shift stage of the transmission 21 inside the transmission case 17, will be referred to as a shift operating unit 35a and an assembly (the shift spindle 31, the shift arm 31a, and the like) that rotates around the shift spindle 31 when a shift operation for the shift pedal 32 is input and transmits this rotation to the shift operating unit 35a will be referred to as a shift operation receiving unit 35b.

Here, the motorcycle 1 employs a so-called semi-automated transmission system (an automated clutch-type transmission system) in which only a shift operation of the transmission 21 (a foot operation of the shift pedal 32) is performed by the driver and connection and disconnection operations of the clutch device 26 are automatically performed by electrical control in accordance with an operation of the shift pedal 32.

<Transmission System>

Figure 4:
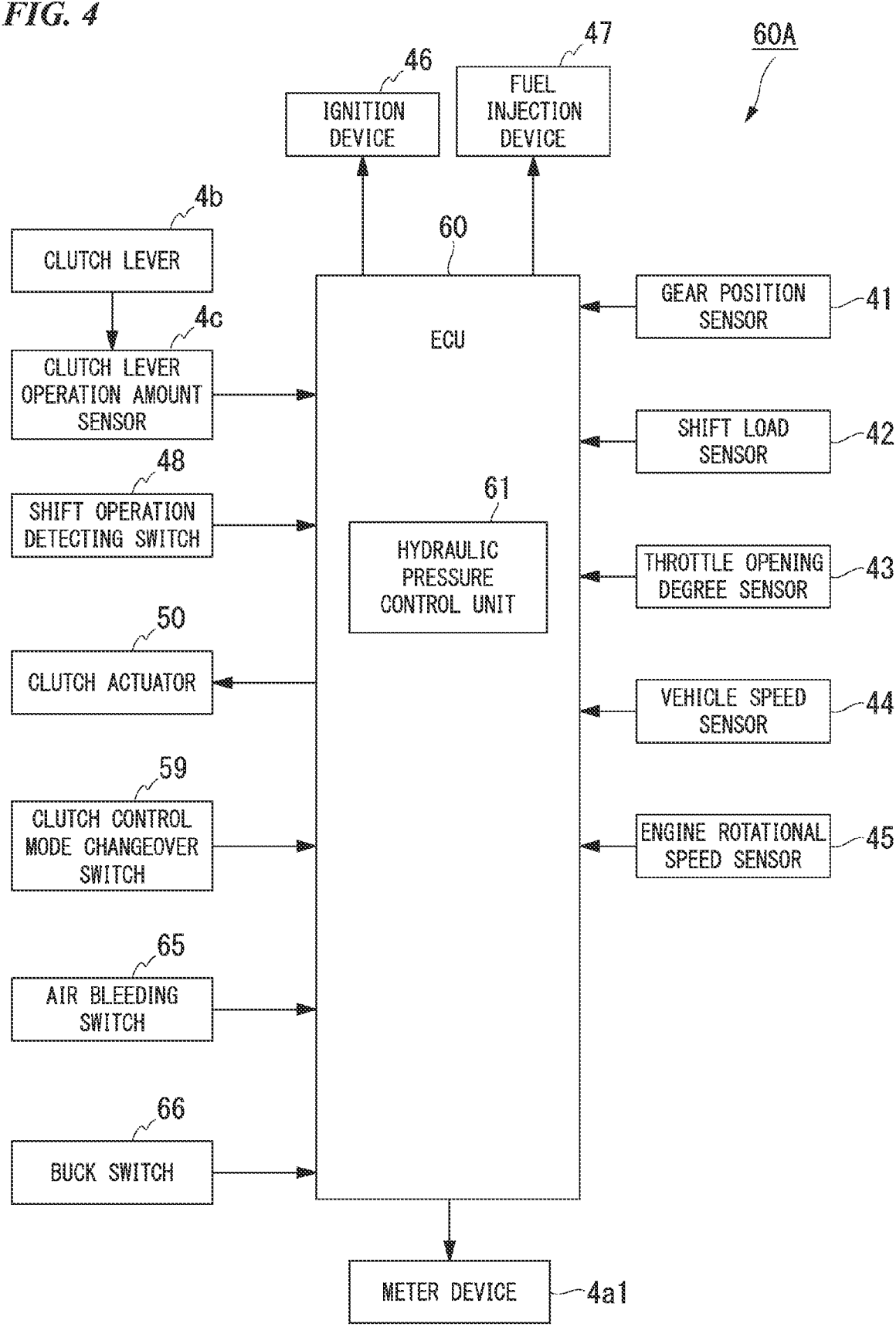
FIG. 4 is a block diagram of a transmission system.

As illustrated in FIG. 4, the above-described transmission system includes a clutch actuator 50, an electronic control unit (ECU) (control unit) 60, and various types of sensors 41 to 45.

The ECU 60 controls the operation of the clutch actuator 50 on the basis of detection information from a gear position sensor 41 that detects a shift stage from a rotation angle of the shift drum 36 and a shift load sensor (for example, a torque sensor) 42 that detects an operation torque input to the shift spindle 31, various types of vehicle state detection information from a throttle opening degree sensor 43, a vehicle speed sensor 44, and an engine rotational speed sensor 45, and the like and controls operations of an ignition device 46 and a fuel injection device 47.

Detection information from hydraulic pressure sensors 57 and 58 and a shift operation detecting switch (a shift neutral switch) 48 to be described below is also input to the ECU 60.

Also, the ECU 60 includes a hydraulic pressure control unit (a clutch control unit) 61 and a function thereof will be described below. In FIG. 4, a reference sign 60A denotes the clutch control device (a hydraulic pressure control device) of the present embodiment.

Figure 3:
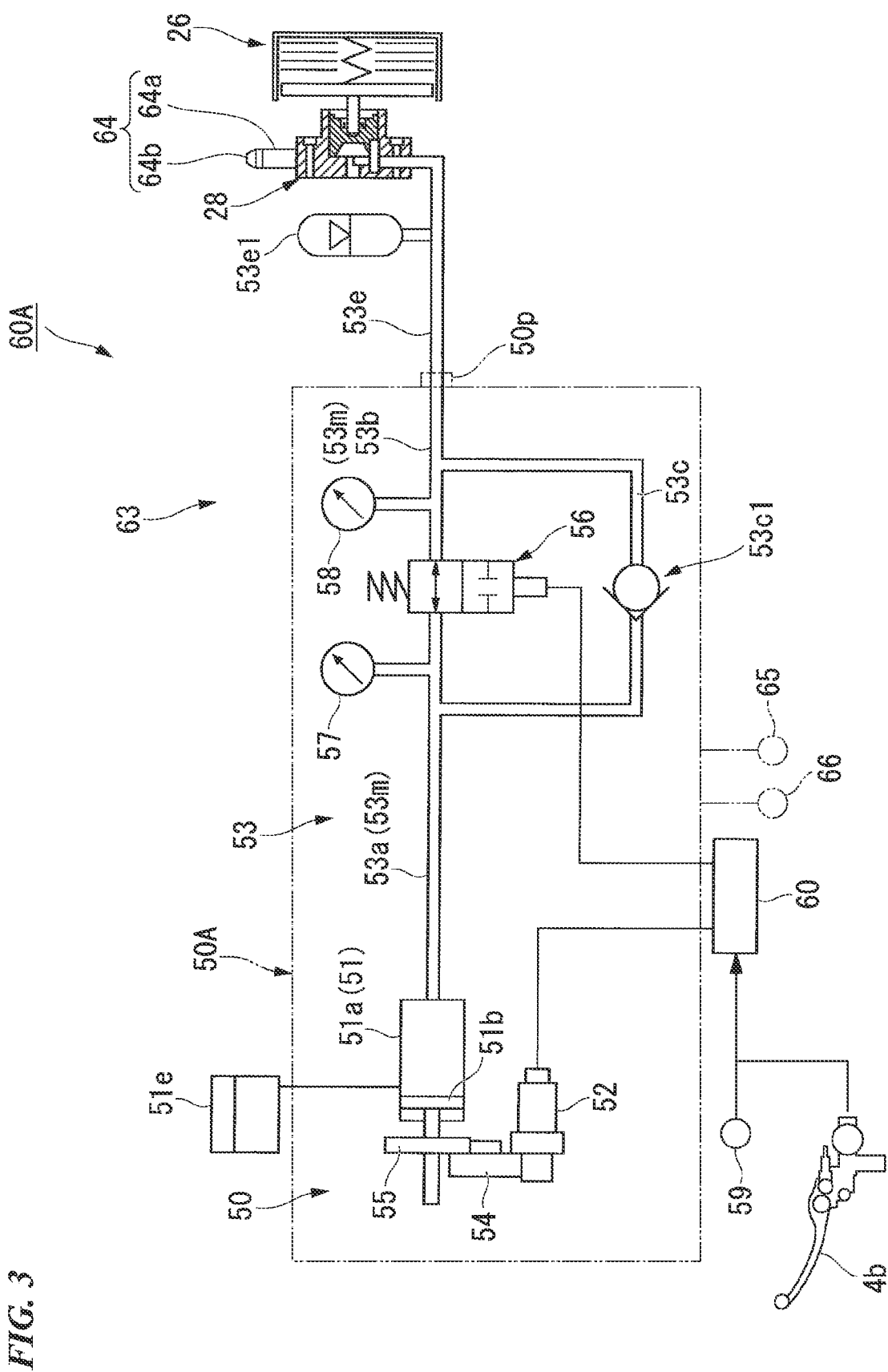
FIG. 3 is a schematic explanatory view of a clutch operating system including a clutch actuator.

Referring also to FIG. 3, the clutch actuator 50 can control a liquid pressure for connecting and disconnecting the clutch device 26 according to operation control by the ECU 60. The clutch actuator 50 includes an electric motor 52 (hereinafter simply referred to as a motor 52) serving as a drive source and a master cylinder 51 driven by the motor 52. The clutch actuator 50 constitutes an integrated clutch control unit 50A together with the hydraulic circuit device 53 provided between the master cylinder 51 and a hydraulic pressure supply-discharge port 50p.

The ECU 60 calculates a target value of a hydraulic pressure (a target hydraulic pressure) supplied to a slave cylinder 28 for connecting and disconnecting the clutch device 26 on the basis of a preset calculation program and controls the clutch control unit 50A such that a hydraulic pressure (a slave hydraulic pressure) of the slave cylinder 28 side detected by the downstream-side hydraulic pressure sensor 58 is close to the target hydraulic pressure. A configuration including a range from the hydraulic circuit device 53 to the slave cylinder 28 is referred to as a hydraulic circuit 63 of the clutch control device 60A.

The master cylinder 51 causes a piston 51b inside a cylinder main body 51a to perform a stroke in accordance with driving of the motor 52 and enables hydraulic oil inside the cylinder main body 51a to be supplied and discharged with respect to the slave cylinder 28. In FIG. 3, a reference sign 55 denotes a conversion mechanism serving as a ball screw mechanism, a reference sign 54 denotes a transmission mechanism disposed across the motor 52 and the conversion mechanism 55, and a reference sign 51e denotes a reservoir connected to the master cylinder 51.

The hydraulic circuit device 53 includes a valve mechanism (a solenoid valve 56) for opening or blocking a middle portion of a main oil path (a hydraulic pressure supply/discharge oil path) 53m extending from the master cylinder 51 to the clutch device 26 side (the slave cylinder 28 side). The main oil path 53m of the hydraulic circuit device 53 can be divided into an upstream-side oil path 53a that is on the master cylinder 51 side from the solenoid valve 56 and a downstream-side oil path 53b that is on the slave cylinder 28 side from the solenoid valve 56. The hydraulic circuit device 53 further includes a bypass oil path 53c that bypasses the solenoid valve 56 and causes the upstream-side oil path 53a and the downstream-side oil path 53b to communicate with each other.

The solenoid valve 56 is a so-called normal open valve. A one-way valve 53c1 for causing hydraulic oil to flow in only one way from the upstream side to the downstream side is provided on the bypass oil path 53c. On the upstream side of the solenoid valve 56, an upstream-side hydraulic pressure sensor 57 for detecting a hydraulic pressure of the upstream-side oil path 53a is provided. On the downstream side of the solenoid valve 56, the downstream-side hydraulic pressure sensor 58 for detecting a hydraulic pressure of the downstream-side oil path 53b is provided.

As illustrated in FIG. 1, for example, the clutch control unit 50A is accommodated in the rear cowl 9a. The slave cylinder 28 is attached to the left side of the rear part of the crank case 15. The clutch control unit 50A and the slave cylinder 28 are connected via a hydraulic piping 53e (see FIG. 3).

As illustrated in FIG. 2, the slave cylinder 28 is coaxially disposed in the left direction of the main shaft 22. When a hydraulic pressure is supplied from the clutch actuator 50, the slave cylinder 28 presses a push load 28a passing through the inside of the main shaft 22 in the right direction. By pressing the push load 28a in the right direction, the slave cylinder 28 causes the clutch device 26 to operate in a connected state via the push load 28a. When there is no supply of the hydraulic pressure, the slave cylinder 28 releases the pressing of the push load 28a and returns the clutch device 26 to a disconnected state.

In order to maintain the clutch device 26 in the connected state, it is necessary to continue the supply of the hydraulic pressure and electric power is consumed to that extent. Therefore, as illustrated in FIG. 3, the solenoid valve 56 is provided in the hydraulic circuit device 53 of the clutch control unit 50A and the solenoid valve 56 is closed after the supply of the hydraulic pressure to the clutch device 26 side. Thereby, the hydraulic pressure supplied to the clutch device 26 side is maintained and a hydraulic pressure corresponding to a decrease in the pressure is configured to be supplemented (recharged by an amount corresponding to a leak), so that the energy consumption is inhibited.

<Clutch Control>

Figure 5:
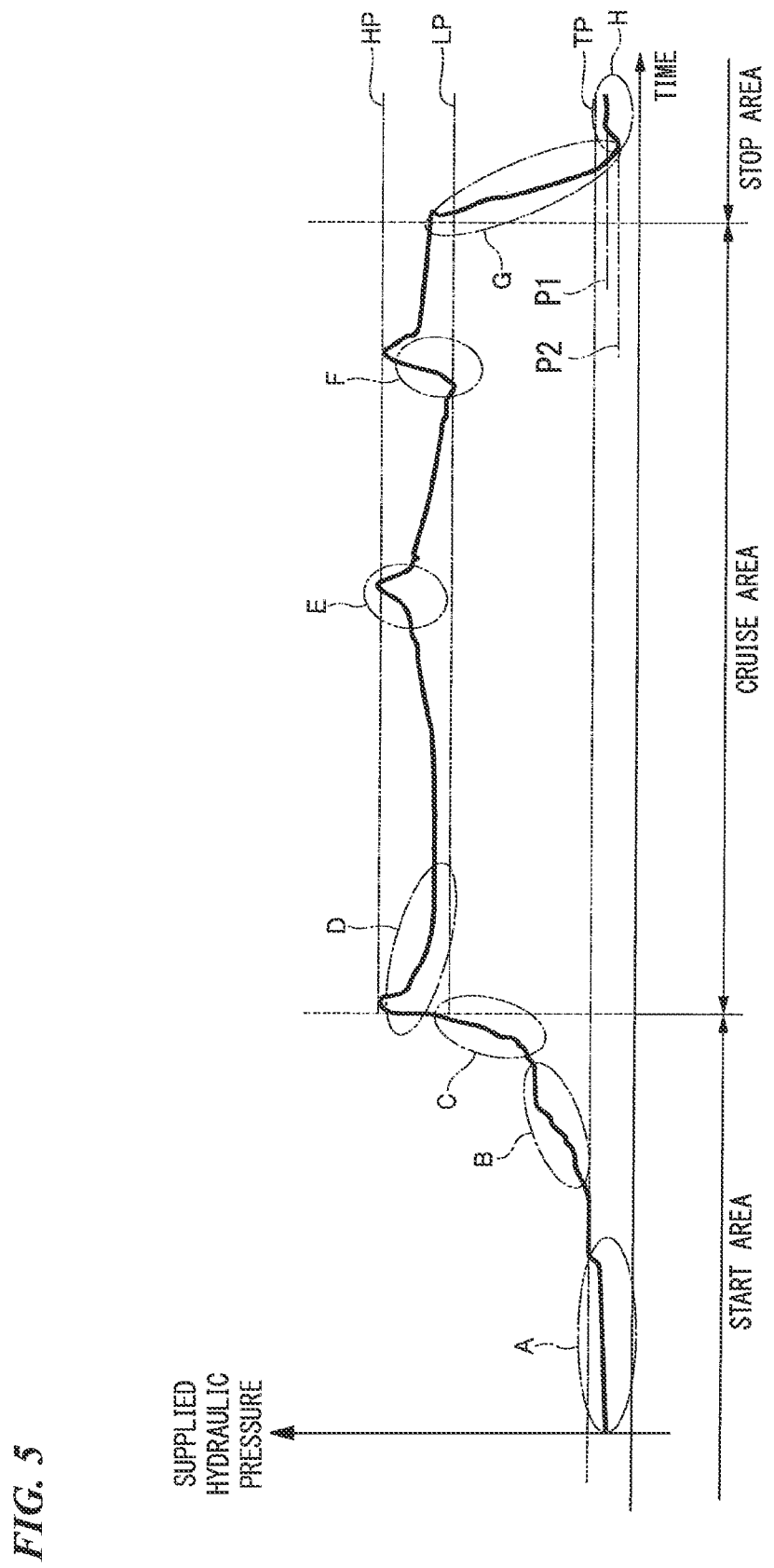
FIG. 5 is a graph illustrating a change in a supplied hydraulic pressure of the clutch actuator.

Next, an action of the clutch control system will be described with reference to a graph of FIG. 5. In the graph of FIG. 5, the vertical axis represents a supplied hydraulic pressure detected by the downstream-side hydraulic pressure sensor 58 and the horizontal axis represents elapsed time.

At the time of stopping (idling) of the motorcycle 1, both the motor 52 and the solenoid valve 56 controlled by the ECU (control unit) 60 are in a state in which the supply of electric power has been blocked. That is, the motor 52 is in a stop state and the solenoid valve 56 is in a valve open state. At this time, the slave cylinder 28 side (the downstream side) is in a low-pressure state having a pressure lower than a touch point hydraulic pressure TP and the clutch device 26 is in a non-fastened state (a disconnected state or a released state). This state corresponds to an area A of FIG. 5.

When the motorcycle 1 is started, electric power is supplied only to the motor 52, and a hydraulic pressure is supplied from the master cylinder 51 to the slave cylinder 28 through the solenoid valve 56 of the valve open state if the rotational speed of the engine 13 is increased. When the hydraulic pressure of the slave cylinder 28 side (the downstream side) is increased to the touch point hydraulic pressure TP or higher, the fastening of the clutch device 26 is started and the clutch device 26 enters a half-clutch state in which partial motive power can be transmitted. Thereby, the motorcycle 1 can be smoothly started. This state corresponds to an area B of FIG. 5.

Thereafter, when a difference between input rotation and output rotation of the clutch device 26 decreases and the hydraulic pressure of the slave cylinder 28 side (the downstream side) reaches a lower limit retaining hydraulic pressure LP, the fastening of the clutch device 26 transitions to a locked state and all the driving force of the engine 13 is transmitted to the transmission 21. This state corresponds to an area C of FIG. 5. The areas A to C form a start area.

When a hydraulic pressure is supplied from the master cylinder 51 side to the slave cylinder 28 side, the solenoid valve 56 is in the valve open state, the motor 52 is driven to rotate in a normal direction according to the application of an electric current to the motor 52, and the master cylinder 51 is pressed. Thereby, the hydraulic pressure of the slave cylinder 28 side is adjusted to a clutch fastening hydraulic pressure. At this time, the driving of the clutch actuator 50 is subjected to feedback control on the basis of a hydraulic pressure detected by the downstream-side hydraulic pressure sensor 58.

When the hydraulic pressure of the slave cylinder 28 side (the downstream side) reaches an upper limit retaining hydraulic pressure HP, electric power is supplied to the solenoid valve 56, the solenoid valve 56 performs a valve closing operation, the supply of electric power to the motor 52 is stopped, and the generation of the hydraulic pressure is stopped. That is, the upstream side enters a low pressure state in accordance with the release of the hydraulic pressure, whereas the downstream side is maintained in the high pressure state (the upper limit retaining hydraulic pressure HP). Thereby, without the master cylinder 51 generating a hydraulic pressure, the clutch device 26 is maintained in the fastened state, and the power consumption can be inhibited while running of the motorcycle 1 is enabled.

Here, a shift may also be performed immediately after a hydraulic pressure is filled in the clutch device 26 according to a shift operation. In this case, before the solenoid valve 56 performs a valve closing operation and causes the upstream side to enter a low pressure state, the motor 52 is reversely driven in a valve open state of the solenoid valve 56 and depressurizes the master cylinder 51 and communicates with the reservoir 51e to relieve hydraulic pressure of the clutch device 26 side to the master cylinder 51 side. At this time, the driving of the clutch actuator 50 is subjected to feedback control on the basis of a hydraulic pressure detected by the upstream-side hydraulic pressure sensor 57.

Even if the solenoid valve 56 is closed and the clutch device 26 is maintained in the fastened state, the hydraulic pressure of the downstream side gradually decreases (leaks) as in an area D of FIG. 5. That is, the hydraulic pressure of the downstream side gradually decreases due to primary causes such as a leakage of the hydraulic pressure and a temperature decrease according to deformation and the like of seals of the solenoid valve 56 and the one-way valve 53c1.

On the other hand, as in the area E of FIG. 5, a hydraulic pressure of the downstream side may also be increased due to an increase in the temperature or the like. Because any small change in the hydraulic pressure of the downstream side can be absorbed by, for example, an accumulator 53e1 (see FIG. 3) provided in the hydraulic piping 53e, and the motor 52 and the solenoid valve 56 are operated every time the hydraulic pressure changes, power consumption is not increased.

As in an area E of FIG. 5, when a hydraulic pressure of the downstream side has increased to the upper limit retaining hydraulic pressure HP, the solenoid valve 56 is set in a valve open state in a stepwise manner due to a decrease in the supply of electric power to the solenoid valve 56 or the like and the hydraulic pressure of the downstream side is relieved toward the upstream side.

As in an area F of FIG. 5, when the hydraulic pressure of the downstream side has decreased to the lower limit retaining hydraulic pressure LP, the supply of electric power to the motor 52 is started in a state in which the solenoid valve 56 has been closed and the hydraulic pressure of the upstream side is increased. When the hydraulic pressure of the upstream side is higher than the hydraulic pressure of the downstream side, this hydraulic pressure is supplied (recharged) to the downstream side via the bypass oil path 53c and the one-way valve 53c1. When the hydraulic pressure of the downstream side becomes the upper limit retaining hydraulic pressure HP, the supply of electric power to the motor 52 is stopped and the generation of the hydraulic pressure is stopped. Thereby, the hydraulic pressure of the downstream side is maintained between the upper limit retaining hydraulic pressure HP and the lower limit retaining hydraulic pressure LP and the clutch device 26 is maintained in the fastened state. The areas D to F are set as a cruise area.

If the transmission 21 becomes neutral when the motorcycle 1 is stopped, the supply of electric power to the motor 52 and the solenoid valve 56 is stopped together. Thereby, the master cylinder 51 stops the generation of a hydraulic pressure and stops the supply of a hydraulic pressure to the slave cylinder 28. The solenoid valve 56 is in a valve open state and the hydraulic pressure within the downstream-side oil path 53b is returned to the reservoir 51e. According to the above, the slave cylinder 28 side (the downstream side) is in a low pressure state with a hydraulic pressure lower than the touch point hydraulic pressure TP and the clutch device 26 is in a non-fastened state. This state corresponds to areas G and H of FIG. 5. The areas G and H are set as a stop area.

On the other hand, if the transmission 21 remains in an in-gear state when the motorcycle 1 stops, a standby state in which a standby hydraulic pressure WP is applied to the slave cylinder 28 side is formed.

The standby hydraulic pressure WP is a hydraulic pressure that is slightly lower than the touch point hydraulic pressure TP at which the connection of the clutch device 26 starts and is a hydraulic pressure (a hydraulic pressure applied to the areas A and H of FIG. 5) at which the clutch device 26 is not connected. In accordance with the application of the standby hydraulic pressure WP, ineffective stroke elimination for the clutch device 26 (the cancellation of a backlash or operating reaction force of each part, the application of a preload to a hydraulic path, or the like) can be performed and operation responsiveness at the time of the connection of the clutch device 26 is improved.

<Shift Control>

Next, shift control of the motorcycle 1 will be described.

In an in-gear stop state in which a gear position of the transmission 21 is in an in-gear state of the first speed and a vehicle speed is lower than a setting value corresponding to stopping, the motorcycle 1 according to the present embodiment performs control for decreasing the standby hydraulic pressure WP supplied to the slave cylinder 28 when a shift operation on the shift pedal 32 from the first speed to neutral is performed.

Here, when the motorcycle 1 is in the stop state and the gear position of the transmission 21 is any shift stage position other than neutral, i.e., when the transmission 21 is in the in-gear stop state, the standby hydraulic pressure WP that has been preset is supplied to the slave cylinder 28.

The standby hydraulic pressure WP is set to a first setting value P1 (see FIG. 5) that is a standard standby hydraulic pressure at normal times (in the case of a non-detected state in which a shift operation of the shift pedal 32 is not detected). Thereby, the clutch device 26 is in a standby state in which the ineffective stroke elimination has been performed and the responsiveness at the time of clutch fastening is improved. That is, when the rotational speed of the engine 13 is increased by the driver increasing a degree of throttle opening, the fastening of the clutch device 26 is immediately started in accordance with the supply of a hydraulic pressure to the slave cylinder 28 and quick start and acceleration of the motorcycle 1 can be performed.

The motorcycle 1 includes a shift operation detecting switch 48 in addition to the shift load sensor 42 so that the driver's shift operation on the shift pedal 32 is detected. For example, the shift operation detecting switch 48 is disposed opposite to the tip end of the shift arm 31a and detects a slight rotation of the shift spindle 31 by the shift operation of the shift pedal 32 with high sensitivity.

In the in-gear stop state, when the shift operation detecting switch 48 detects a shift operation from the first speed to neutral, the hydraulic pressure control unit 61 performs control for setting the standby hydraulic pressure WP to a second setting value P2 (a low standby hydraulic pressure; see FIG. 5) lower than the first setting value P1 before the shift operation.

When the transmission 21 is in the in-gear state, the standard standby hydraulic pressure corresponding to the first setting value P1 is supplied to the slave cylinder 28 at normal times, so that so-called dragging is slightly generated in the clutch device 26. At this time, a dog and a slot (a dog hole) engaged with each other in the dog clutch of the transmission 21 may press each other in the rotation direction and cause resistance to disengagement and the shift operation may become heavy. In this case, if the standby hydraulic pressure WP supplied to the slave cylinder 28 is decreased to a low standby hydraulic pressure corresponding to the second setting value P2, the engagement between the dog and the slot can be easily released and the shift operation becomes light.

<Clutch Control Mode>

Figure 7:
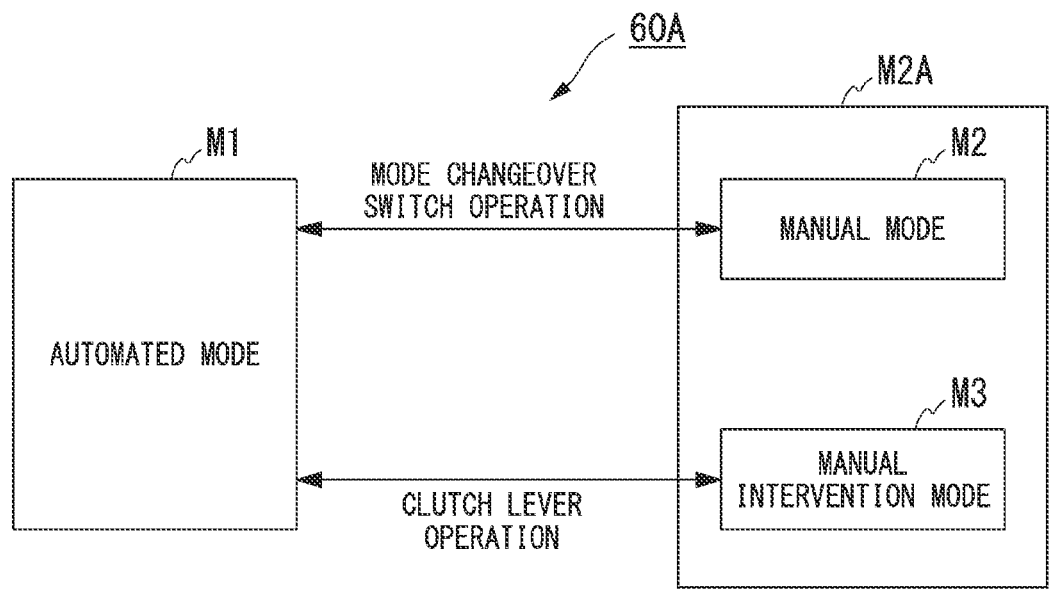
FIG. 7 is an explanatory diagram illustrating the transition of a clutch control mode according to the embodiment of the present invention.

As illustrated in FIG. 7, the clutch control device 60A according to the present embodiment has three types of clutch control modes. The clutch control mode appropriately transitions between three types of modes including an automated mode M1 in which automated control is performed, a manual mode M2 in which a manual operation is performed, and a manual intervention mode M3 in which a temporary manual operation is performed in accordance with operations of a clutch control mode changeover switch (a control mode changeover switch) 59 (see FIG. 4) and a clutch lever 4b (see FIG. 1). Also, targets including the manual mode M2 and the manual intervention mode M3 will be referred to as a manual system M2A.

The automated mode M1 is a mode in which the clutch device 26 is controlled by calculating a clutch capacity suitable for a traveling state in accordance with automated start/shift control. The manual mode M2 is a mode in which the clutch device 26 is controlled by calculating a clutch capacity in accordance with an occupant's clutch operation instruction. The manual intervention mode M3 is a temporary manual operation mode in which the clutch device 26 is controlled by receiving a clutch operation instruction from the occupant during the automated mode M1 and calculating a clutch capacity from the clutch operation instruction. Also, the manual intervention mode is set such that the mode is returned to the automated mode M1 when the occupant stops (completely releases) the operation on the clutch lever 4b during the manual intervention mode M3.

The clutch control device 60A according to the present embodiment generates a clutch control hydraulic pressure by driving an oil pump (not illustrated) using a rotary driving force of the engine 13. Thus, the clutch control device 60A starts control from a clutch off state (a disconnected state) in the automated mode M1 at the time of system startup. Also, because a clutch operation is unnecessary when the engine 13 is stopped, the clutch control device 60A is set to return to the clutch off state in the automated mode M1.

Basically, in the automated mode M1, clutch control is automatically performed and the motorcycle 1 is enabled to travel without any lever operation. In the automated mode M1, a clutch capacity is controlled according to a degree of throttle opening, an engine speed, a vehicle speed, and a shift sensor output. Thereby, the motorcycle 1 can start without an engine failure (engine stop or engine stall) in only a throttle operation and a shift can be performed in only a shift operation. However, at the time of an extremely low speed corresponding to idling, the clutch device 26 may be automatically disconnected. Also, by gripping the clutch lever 4b in the automated mode M1, the mode is switched to the manual intervention mode M3 and the clutch device 26 can be arbitrarily disconnected.

On the other hand, in the manual mode M2, a clutch capacity is controlled according to a lever operation by the occupant. Switching between the automated mode M1 and the manual mode M2 can be performed by operating the clutch control mode changeover switch 59 (see FIG. 4) while the vehicle is stopped. Also, the clutch control device 60A may include an indicator indicating validity of a lever operation at the time of the transition to the manual system M2A (the manual mode M2 or the manual intervention mode M3).

In the manual mode M2, basically, clutch control is manually performed and a clutch hydraulic pressure can be controlled in accordance with an operation angle of the clutch lever 4b. Thereby, the connection and disconnection of the clutch device 26 can be controlled in accordance with the occupant's intention and the vehicle can also travel by the clutch device 26 being connected at the time of an extremely low speed corresponding to idling. However, an engine failure may be caused due to a lever operation and automatic starting in only a throttle operation cannot be performed. Also, clutch control is automatically performed through intervention at the time of a shift operation in the manual mode M2.

Although the connection and disconnection of the clutch device 26 are automatically performed by the clutch actuator 50 in the automated mode M1, a manual operation can be temporarily performed through intervention in the automated control of the clutch device 26 when a manual clutch operation is performed on the clutch lever 4b (the manual intervention mode M3).

Figure 6:
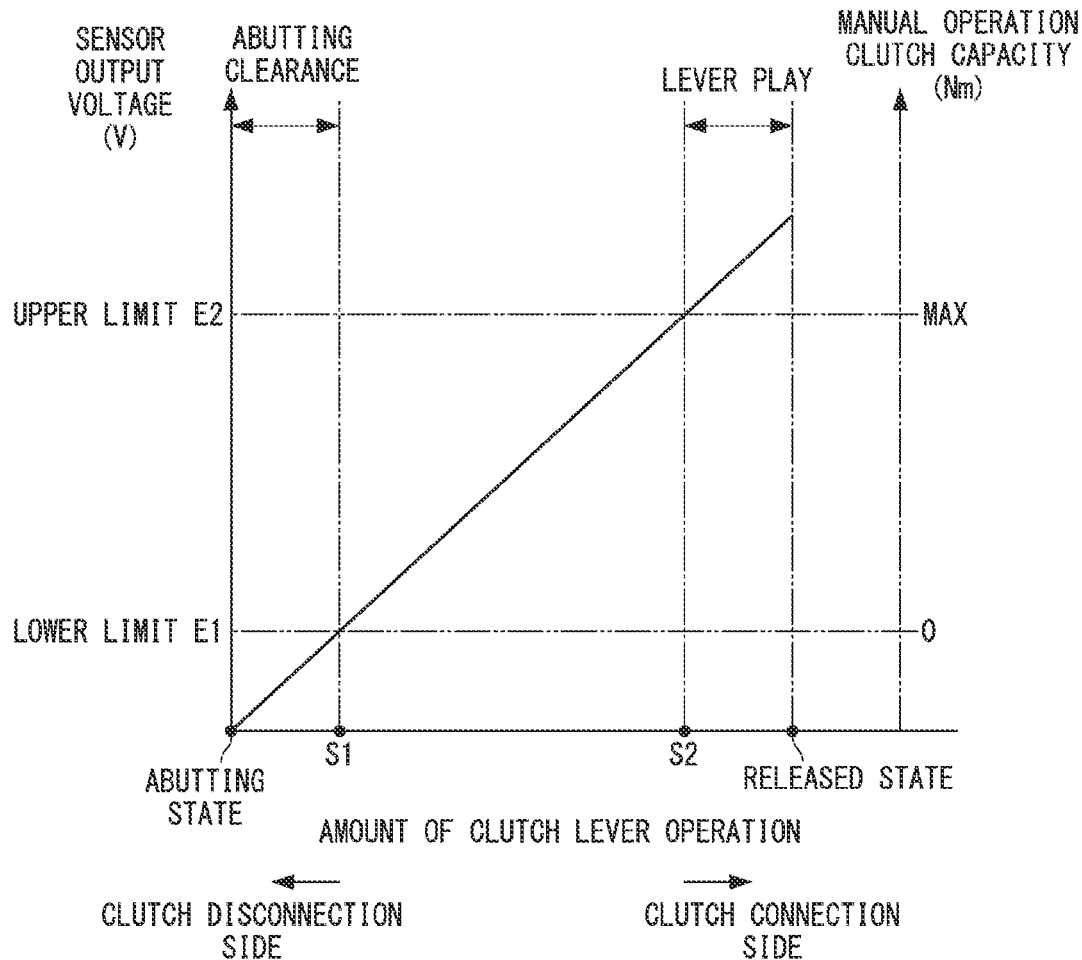
FIG. 6 is a graph illustrating correlations between an amount of clutch lever operation, a sensor output voltage, and a clutch capacity according to the embodiment of the present invention.

As illustrated in FIG. 6, an amount of operation (a rotation angle) of the clutch lever 4b and an output value of a clutch lever operation amount sensor (a clutch operation amount sensor) 4c are in a mutually proportional relation (a correlation). The ECU 60 calculates a target hydraulic pressure of the clutch device 26 on the basis of an output value of the clutch lever operation amount sensor 4c. An actual hydraulic pressure (a slave hydraulic pressure) generated in the slave cylinder 28 follows a target hydraulic pressure delayed by the pressure loss.

<Manual Clutch Operation>

As illustrated in FIG. 1, the clutch lever 4b serving as a manual clutch operating element is attached to a base side (an inner side in the vehicle width direction) of the left grip of the steering handle 4a. The clutch lever 4b has no mechanical connection with the clutch device 26 using a cable, a hydraulic pressure, or the like and functions as an operating element for transmitting a clutch operation request signal to the ECU 60. That is, the motorcycle 1 employs a clutch-by-wire system in which the clutch lever 4b and the clutch device 26 are electrically connected to each other.

Referring also to FIG. 4, the clutch lever operation amount sensor 4c, which detects the amount of operation (the rotation angle) of the clutch lever 4b, is integrally provided in the clutch lever 4b. The clutch lever operation amount sensor 4c converts the amount of operation of the clutch lever 4b into an electrical signal and outputs the electrical signal. In a state in which the operation of the clutch lever 4b is valid (the manual system M2A), the ECU 60 drives the clutch actuator 50 on the basis of an output of the clutch lever operation amount sensor 4c. Also, the clutch lever 4b and the clutch lever operation amount sensor 4c may be formed as an integrated body or separate bodies.

The motorcycle 1 includes the clutch control mode changeover switch 59 that switches between control modes of a clutch operation. The clutch control mode changeover switch 59 can arbitrarily perform switching between the automated mode M1 in which clutch control is automatically performed under a predetermined condition and the manual mode M2 in which clutch control is manually performed in accordance with an operation of the clutch lever 4b. For example, the clutch control mode changeover switch 59 is provided in a handle switch attached to the steering handle 4a. Thereby, the occupant can easily operate the clutch control mode changeover switch 59 at the time of normal driving.

For example, control modes between which switching can be performed by the clutch control mode changeover switch 59 include an air bleeding operation mode and an air bleeding completion check mode.

The air bleeding operation mode is selected when air bleeding of a hydraulic circuit 63 (a configuration including the hydraulic circuit device 53 and the slave cylinder 28) of the clutch control device 60A is performed. In the air bleeding operation mode, the hydraulic pressure within the hydraulic circuit 63 is increased by operating an air bleeding switch (a boost switch) 65. Also, in the air bleeding operation mode, it is possible to decrease the hydraulic pressure within the hydraulic circuit 63 after the pressure is increased by operating a buck switch 66.

The air bleeding completion check mode is selected after the air bleeding operation. In the air bleeding completion check mode, the completion of air bleeding is determined from a pressure increase time within the hydraulic circuit 63.

Various information related to air bleeding control including the air bleeding operation mode and the air bleeding completion check mode is displayed on a meter device 4a1 provided near the steering handle 4a.

Referring also to FIG. 6, the clutch lever 4b can rotate between a released state in which the clutch lever 4b rotates to a clutch connection side when the clutch lever 4b is released without being gripped by the occupant and an abutting state in which the clutch lever 4b rotates to a grip side (a clutch disconnection side) and abuts against the grip in accordance with the gripping of the occupant. When the gripping operation of the occupant is released, the clutch lever 4b is biased to return to the released state that is an initial position.

For example, the clutch lever operation amount sensor 4c may be configured such that an output voltage is set to zero in a state in which the clutch lever 4b is completely gripped (the abutting state) and the output voltage is increased in accordance with a release operation (an operation toward the clutch connection side) of the clutch lever 4b from that state. In the present embodiment, a range in which a voltage for a lever play part present at the start of the gripping of the clutch lever 4b and a voltage for an abutting clearance for securing a gap of a degree at which a finger enters between the gripped lever and the grip among output voltages of the clutch lever operation amount sensor 4c are excluded is set to a range of valid voltages (a valid operation range of the clutch lever 4b).

Specifically, a range between an amount of operation S1 when the clutch lever 4b is released by an amount corresponding to the abutting clearance from the state in which the clutch lever 4b abuts and an amount of operation S2 when the clutch lever 4b is released until an amount corresponding to the lever play part starts is set in correspondence with a range from a lower limit value E1 to an upper limit value E2 of the valid voltage. This range from the lower limit value E1 to the upper limit value E2 corresponds to a range from zero to MAX of the calculated value of a manually operated clutch capacity in a proportional relation. Thereby, influences of a mechanical backlash, a sensor variation, and the like are reduced and the reliability of an amount of driving of the clutch requested by a manual operation can be improved. Also, a voltage at the time of the amount of operation S1 of the clutch lever 4b may be set as the upper limit value E2 of the valid voltage and a voltage at the time of the amount of operation S2 may be set as the lower limit value E1.

<Air Bleeding Control>

Next, air bleeding control of the clutch control device 60A will be described.

Referring to FIG. 3, the air bleeding control is performed, for example, when the hydraulic circuit 63 of the clutch control device 60A is filled with a fluid (hydraulic oil), during maintenance, and the like. The air bleeding operation mode and the air bleeding completion check mode in the air bleeding control can be selected according to an operation on the clutch control mode changeover switch 59 (see FIG. 4). Also, a separate switching means capable of selecting air bleeding control may be provided.

First, the air bleeding operation mode will be described.

Referring to FIGS. 3 and 4, in the air bleeding control, the hydraulic pressure within the hydraulic circuit 63 can be increased according to an operation on the air bleeding switch 65 separate from the clutch lever 4b. At this time, the hydraulic pressure up to the clutch connection is subjected to feedback control to protect the electric motor 52 of the clutch actuator 50 as much as possible. Thereby, it is possible to enable a reliable air bleeding operation while protecting the electric motor 52 of the clutch actuator 50.

When the air bleeding operation is performed, the control mode is first switched from the three types of clutch control modes M1 to M3 (normal control modes) (see FIG. 7) to the air bleeding operation mode according to an operation on the clutch control mode changeover switch 59. At this time, a notification indicating that the control mode is the "air bleeding operation mode" (the air bleeding standby state) is displayed on the meter device 4a1. The air bleeding operation mode can be selected on condition that the gear is in neutral and the engine is in operation.

In the air bleeding operation mode, the clutch actuator 50 is driven to increase the hydraulic pressure according to a specified operation on the air bleeding switch 65. At this time, a notification indicating that the "pressure is increasing" is displayed on the meter device 4a1. The air bleeding switch 65 is, for example, a push-type button, and is provided in the clutch control unit 50A.

As a first pressure increase pattern, the clutch control hydraulic pressure is first increased according to PID control until the clutch control hydraulic pressure corresponds to the touch point hydraulic pressure TP (450 kpa, hereinafter referred to as a first specified value pa1). Subsequently, the clutch control hydraulic pressure is set to a slightly lower hydraulic pressure (430 kpa, hereinafter referred to as a second specified value pa2) and a motor duty ratio (DUTY) is lowered. The load for the friction of the master cylinder 51 is adjusted by slightly decreasing the hydraulic pressure after the hydraulic pressure is increased. After the motor duty ratio is lowered in this manner, a uniform motor duty ratio is retained. At this time, a notification indicating that the "increase in the pressure has been completed" is displayed on the meter device 4a1.

As a second pressure increase pattern, when the clutch control hydraulic pressure has not increased to the first specified value pa1, a uniform motor duty ratio is retained after a predetermined specified time period ta1 and unnecessary overload of the motor is minimized. At this time, a notification indicating that the "increase in the pressure has not been completed" is displayed on the meter device 4a1.

In any pressure increase pattern, a uniform duty ratio of the clutch actuator 50 is maintained due to a time limit. Thereby, the electric motor 52 is protected by maintaining a uniform duty ratio of the clutch actuator 50 even if the clutch control hydraulic pressure does not increase due to, for example, trapping of air (mixing of air).

The uniform duty ratio of the clutch actuator 50 (the electric motor 52) is maintained because, if a predetermined load is not continuously applied to the motor as a premise of the hydraulic circuit 63 according to the embodiment, the motor is pushed back and reversely rotated by the increased hydraulic pressure and the hydraulic pressure decreases. That is, this is because, when the "drive" of the motor is stopped, the increased hydraulic pressure cannot be maintained and the hydraulic pressure decreases.

The uniform duty ratio is maintained by maintaining the voltage applied to the motor at a predetermined value. Thereby, the hydraulic pressure is maintained at a uniform pressure that has increased. When this hydraulic pressure increases, the voltage applied to the motor is controlled according to PID control so that the difference between the target hydraulic pressure and the current hydraulic pressure is reduced.

Referring to FIG. 3, for example, an air bleeding device 64 for bleeding air within the hydraulic circuit 63 is provided in the slave cylinder 28. The air bleeding device 64 includes an air bleeding port 64a formed in the housing of the slave cylinder 28 and a bleeder bolt 64b screwed to the air bleeding port 64a. After the clutch control hydraulic pressure increases, the operator loosens the bleeder bolt 64b and discharges the fluid containing air bubbles. The bleeder bolt 64b is quickly re-tightened to prevent backflow of air. For example, when the slave hydraulic pressure has decreased at a speed higher than or equal to a predetermined speed in the air bleeding operation mode, the ECU determines that the air bleeding port 64a has been opened. At this time, a notification indicating that the "port is opened" is displayed on the meter device 4a1.

When the air bleeding port 64a is opened, the fluid is discharged according to the hydraulic pressure increased by the electric motor 52. At this time, although a piston of the slave cylinder 28 is pushed back to an initial position before the pressure increases, completely returning to the initial position is time-consuming. The ECU 60 does not receive any other operation until the piston of the slave cylinder 28 is completely returned. At this time, the display of the meter device 4a1 may be a notification indicating that the "port is opened", but may return to the display of the "air bleeding standby state."

Subsequently, a series of air bleeding operations from a pressure increasing operation to an air discharging operation is iterated and it is checked that air is no longer mixed in the discharged fluid according to visual inspection or the like. After it is checked that the air is no longer mixed in, the clutch control mode changeover switch 59 is operated to change the control mode from the air bleeding operation mode to the air bleeding completion check mode. At this time, a notification of the "air bleeding completion check mode" is displayed on the meter device 4a1. In the air bleeding operation mode, control such as restriction of the clutch operation by the clutch lever 4b or the like may be performed.

Next, the air bleeding completion check mode will be described.

Figure 8:
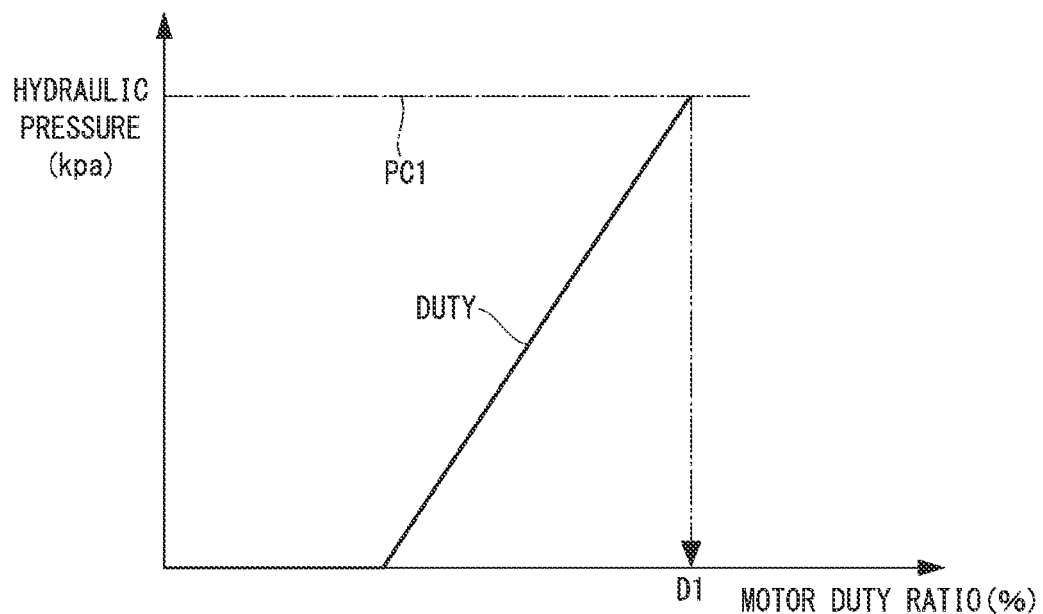
FIG. 8 is a graph illustrating a correlation between a motor duty ratio and a hydraulic pressure in the clutch control device according to the embodiment of the present invention.

Referring to FIG. 8, in the air bleeding completion check mode, a motor duty ratio D1 at which the clutch control hydraulic pressure reaches PC1 is first calculated. This is because a relationship between the duty ratio and the hydraulic pressure changes according to an individual difference of the motor and a temperature of the motor. For example, when the temperature of the motor becomes high, the resistance of the stator coil increases, so that the hydraulic pressure may not increase so much even if the duty ratio increases.

Figure 9:
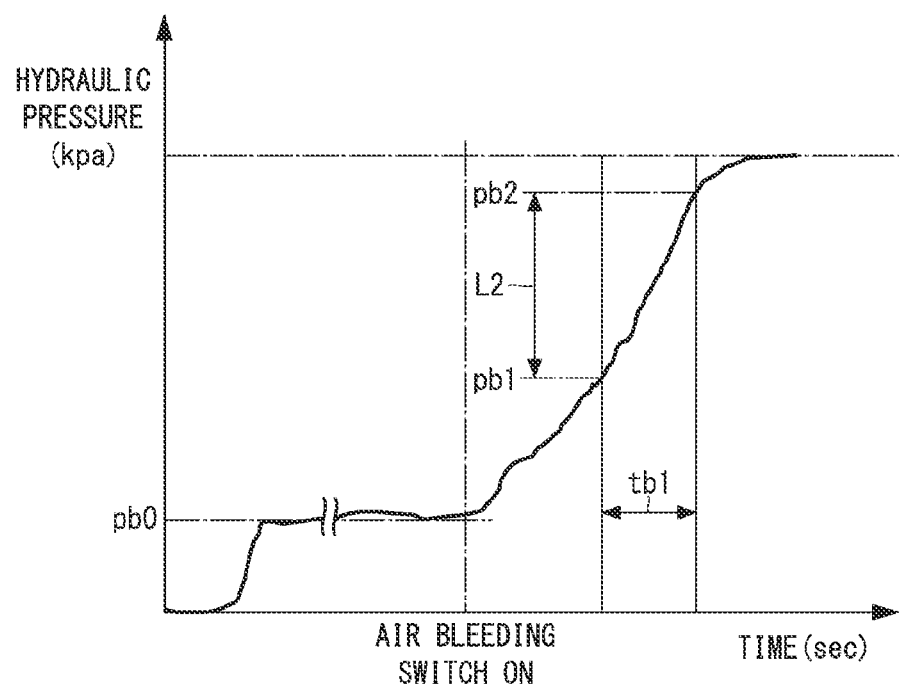
FIG. 9 is a graph illustrating a change over time in the hydraulic pressure when completion of air bleeding is checked in the clutch control device according to the embodiment of the present invention.

Referring to FIG. 9, in the air bleeding completion check mode, the hydraulic pressure is first maintained at pb0 according to PID control. Next, in accordance with an ON operation on the air bleeding switch 65, the clutch actuator 50 is driven at a predetermined motor duty ratio D1 to increase the hydraulic pressure. At this time, it is determined whether or not the air bleeding has been completed according to whether or not a detection value of the clutch control hydraulic pressure (the slave hydraulic pressure) has passed through a characteristic stabilization area L2 within a predetermined check determination time period tb1. The characteristic stabilization area L2 is a hydraulic pressure area from a predetermined first determination value (hydraulic pressure) pb1 to a similarly predetermined second determination value (hydraulic pressure) pb2. In the air bleeding completion check mode, it is determined whether or not a time period required for increasing the hydraulic pressure from the first determination value pb1 to the second determination value pb2 is less than the check determination time period tb1.

Figure 10:
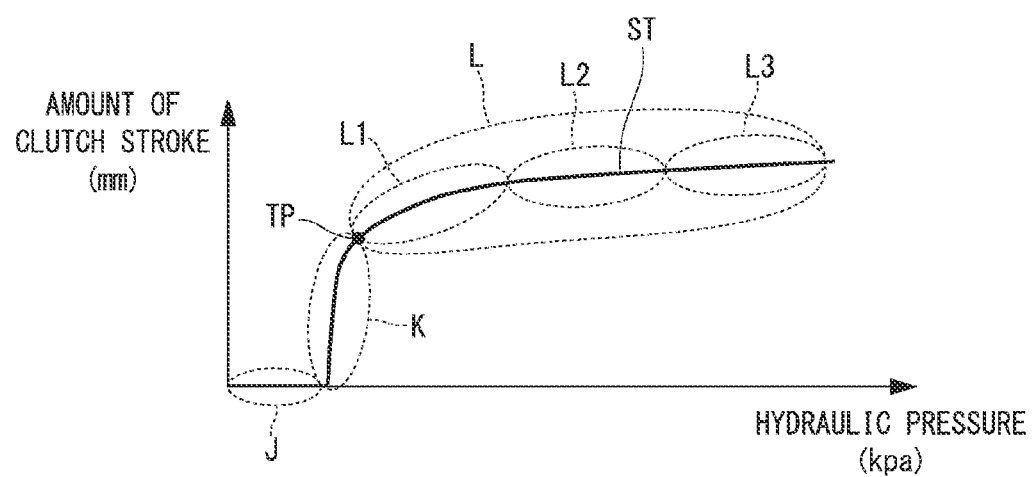
FIG. 10 is a graph illustrating a correlation between a hydraulic pressure and a clutch stroke in the clutch limiting device according to the embodiment of the present invention.

FIG. 10 illustrates a correlation between the clutch control hydraulic pressure (the slave hydraulic pressure) and the amount of stroke (the amount of clutch stroke) of the clutch device 26.

As illustrated in FIG. 10, the amount of clutch stroke ST is classified into a stationary area J, a stroke area K, and a torque control area L in accordance with a hydraulic pressure that has been assigned.

The stationary area J is an area in which the clutch device 26 is in a stationary state before operation.

The stroke area K is an area in which the clutch device 26 is in operation for ineffective stroke elimination (during the stroke). The ineffective stroke elimination is the gap filling until the hydraulic pressure reaches the touch point hydraulic pressure TP. In the stroke area K, it is necessary to control the stroke in a narrow hydraulic pressure range.

The torque control area L is an area in which the clutch device 26 is controlling a transmission load (a clutch capacity) after the touch point hydraulic pressure TP is reached. In the torque control area L, the amount of stroke is small and a change in the hydraulic pressure is large as compared with the stroke area K. A correlation between the stroke and the hydraulic pressure in the clutch device 26 is significantly different before and after the touch point hydraulic pressure TP in terms of characteristics.

The torque control area L is classified into a judder spring area L1, a characteristic stabilization area L2, and an accumulator operating area L3.

The judder spring area L1 is an area for compressing and deforming the judder spring within the clutch device and has a larger amount of stroke with respect to a change in the hydraulic pressure than the subsequent areas.

The characteristic stabilization area L2 is an area after the judder spring is completely compressed. In the characteristic stabilization area L2, there is substantially no amount of stroke with respect to the change in the hydraulic pressure. The characteristic stabilization area L2 is an area from a point in time when the change in the amount of stroke with respect to the change in the hydraulic pressure becomes less than or equal to a specified value to a point in time when the accumulator 53e1 starts an operation.

The accumulator operating area L3 is an area in which the accumulator 53e1 is operated to accumulate an excess hydraulic pressure. In the accumulator operating area L3, there is substantially no amount of stroke with respect to a change in the hydraulic pressure. At this time, according to the hydraulic pressure increased by the electric motor 52, the fluid (air bleeding) is discharged when the bleeder bolt 64b is loosened.

FIG. 9 illustrates a change over time in the clutch control hydraulic pressure in the air bleeding completion check mode.

As illustrated in FIG. 9, when the clutch actuator 50 is operated at a uniform motor duty ratio, the clutch control hydraulic pressure increases with the passage of time. At this time, it is determined whether or not a passing time period from the start hydraulic pressure (the first determination value pb1) to the end hydraulic pressure (the second determination value pb2) of the characteristic stabilization area L2 is less than the predetermined check determination time period tb1. When the passing time period of the characteristic stabilization area L2 is less than the check determination time period tb1, it is determined that the air bleeding has been completed. When the passing time period of the characteristic stabilization area L2 exceeds the check determination time period tb1, it is determined that the air bleeding has not been completed on the assumption that an increase in the hydraulic pressure is hindered due to trapping of air.

When it is determined that the air bleeding has been completed, the air bleeding completion check mode ends and the control mode returns to the normal control mode. When it is determined that the air bleeding has been completed, "air bleeding OK" is displayed on the meter device 4a1.

When it is determined that the air bleeding has not been completed, the control mode returns to the air bleeding mode again and an operator is prompted to iterate a series of operations from a pressure increasing operation to an air discharging operation. When it is determined that the air bleeding has not been completed, "air bleeding NG" is displayed on the meter device 4a1. In the air bleeding completion check mode, control such as restriction of the clutch operation by the clutch lever 4b may be performed.

<Air Bleeding Operation Flow>

Figure 11:
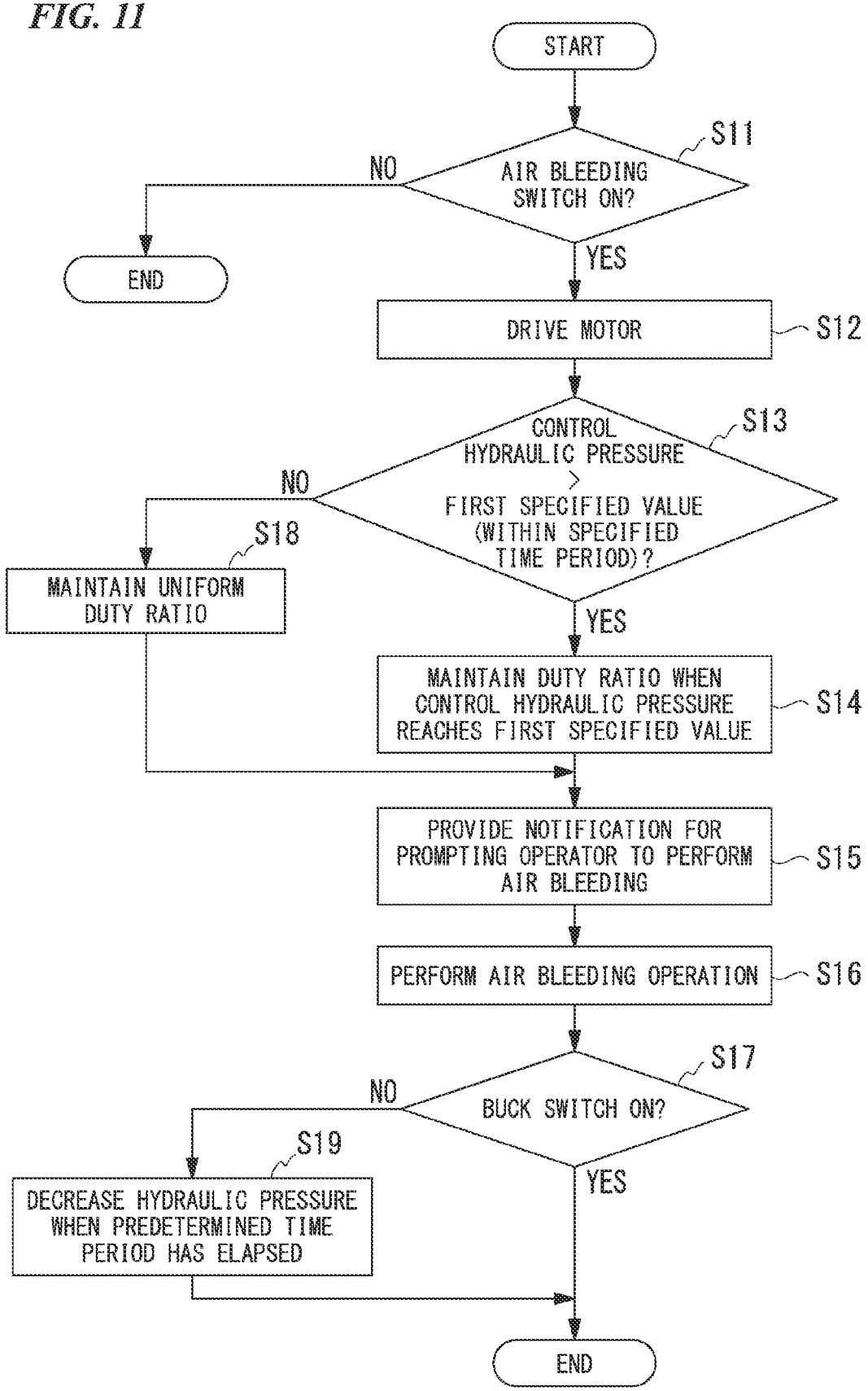
FIG. 11 is a flowchart illustrating a first control flow in the clutch control device according to the embodiment of the present invention.

Next, an example of a process of the ECU 60 in the air bleeding operation mode will be described with reference to a flowchart of FIG. 11. This process starts when the air bleeding operation mode has been selected.

First, in step S11, it is determined whether or not an ON operation such as an operation of pressing the air bleeding switch 65 has been performed. In the case of YES (when the air bleeding switch 65 is ON) in step S11, the process proceeds to step S12 and the electric motor 52 of the clutch actuator 50 is driven to increase the control hydraulic pressure. In the case of NO (when the air bleeding switch 65 is OFF) in step S11, the process temporarily ends.

After the clutch actuator 50 is driven in step S12, the process proceeds to step S13 and it is determined whether or not the control hydraulic pressure exceeds the first specified value pa1 (corresponding to the touch point hydraulic pressure TP) within the specified time period ta1. In the case of YES (when the control hydraulic pressure exceeds the first specified value pa1) in step S13, the process proceeds to step S14 and the motor duty ratio when the first specified value pa1 is reached is maintained. Subsequently, the process proceeds to step S15 and a notification for prompting the operator to perform the air bleeding is provided. After the pressure is increased until the control hydraulic pressure exceeds the first specified value pa1, the operator loosens the bleeder bolt 64b and discharges the fluid containing air bubbles (the air bleeding operation in step S16).

In the case of NO (when the control hydraulic pressure is less than or equal to the first specified value pa1) in step S13, the process proceeds to step S18 and a uniform duty ratio (DUTY) is maintained. Subsequently, the process proceeds to step S15.

After the air bleeding operation in step S16, it is determined whether or not the buck switch 66 has been turned on after step S17. In the case of YES (when the buck switch 66 is ON) in step S17, the process ends on the assumption that the control hydraulic pressure has returned to a state before the pressure was increased. In the case of NO (when the buck switch 66 is OFF) in step S17, the process proceeds to step S19 and a process of automatically decreasing the pressure ends when a predetermined time period has elapsed (so that the overload of the motor is minimized).

<Air Bleeding Completion Check Flow>

Figure 12:
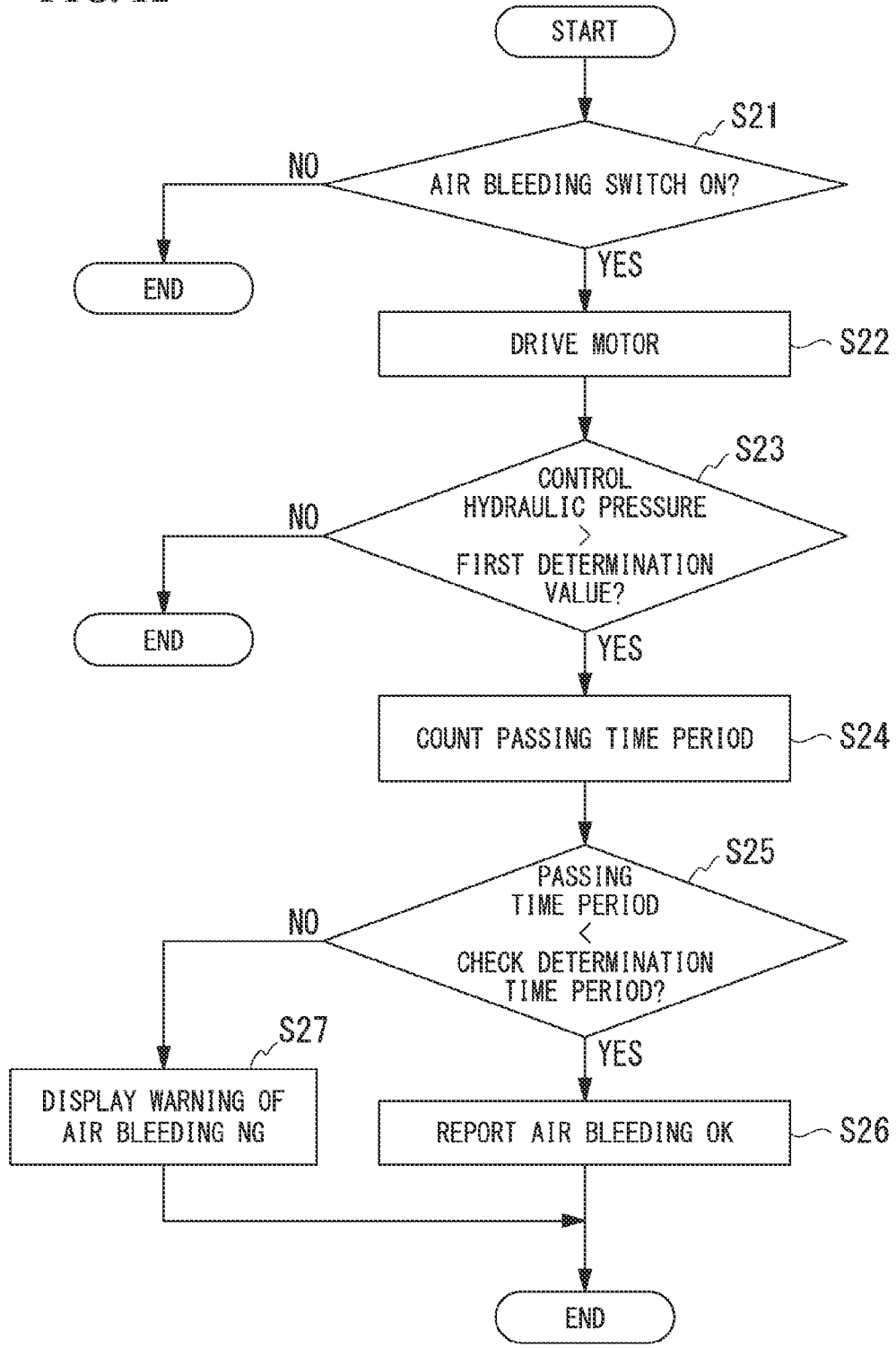
FIG. 12 is a flowchart illustrating a second control flow in the clutch control device according to the embodiment of the present invention.

Next, an example of a process of the ECU in the air bleeding completion check mode will be described with reference to the flowchart of FIG. 12. This process starts when the air bleeding completion check mode has been selected.

First, in step S21, it is determined whether or not an ON operation such as an operation of pressing the air bleeding switch 65 has been performed. In the case of YES (when the air bleeding switch 65 is ON) in step S21, the process proceeds to step S22 and the electric motor 52 of the clutch actuator 50 is driven to increase the control hydraulic pressure. In the case of NO (when the air bleeding switch 65 is OFF) in step S21, the process temporarily ends.

After the clutch actuator 50 is driven in step S22, the process proceeds to step S23 and it is determined whether or not the control hydraulic pressure exceeds the first determination value pb1. In the case of YES (when the control hydraulic pressure exceeds the first determination value pb1) in step S23, the process proceeds to step S24 and the passing time period of the characteristic stabilization area L2 from the first determination value pill to the second determination value pb2 is counted. In the case of NO (when the control hydraulic pressure is less than or equal to the first determination value pill) in step S23, the process temporarily ends.

After the passing time period of the characteristic stabilization area L2 is counted, the process proceeds to step S25 and it is determined whether or not the passing time period is less than the check determination time period tb1. In the case of YES (when the passing time period is less than the check determination time period tb1) in step S25, the process proceeds to step S26 and "air bleeding OK" is displayed (reported) on the meter device 4a1. In the case of NO (when the passing time period is greater than or equal to the check determination time period tb1) in step S25, the process proceeds to step S27 and "air bleeding NG" is displayed (a warning thereof is displayed) on the meter device 4a1.

As described above, according to the above-described embodiment, the clutch control device 60A includes the engine 13, the transmission 21, the clutch device 26 configured to connect and disconnect motive power transmission between the engine 13 and the transmission 21, the clutch actuator 50 configured to drive the clutch device 26 and change a clutch capacity, the hydraulic circuit 63 provided between the clutch device 26 and the clutch actuator 50, the air bleeding device 64 configured to perform air bleeding of the hydraulic circuit 63, the ECU 60 configured to calculate a control target value of the clutch capacity, the control mode changeover switch 59 configured to enable a control mode of the ECU 60 to be switched to an air bleeding mode, and the air bleeding switch 65 configured to enable a hydraulic pressure of the hydraulic circuit 63 to increase in the air bleeding mode.

According to this configuration, it is possible to set the air bleeding mode in the control unit (the ECU 60) of a clutch-by-wire system, increase the hydraulic pressure of the hydraulic circuit 63 in the air bleeding mode, and perform an air bleeding operation according to an operation on the air bleeding switch 65. That is, it is possible to drive the clutch actuator 50 to perform the air bleeding operation on the premise of trapping of air, as compared with a case in which the hydraulic pressure of the hydraulic circuit 63 is increased with normal control. Thus, it is possible to facilitate the air bleeding operation while minimizing the overload of the clutch actuator 50.

In the clutch control device 60A, the clutch actuator 50 decreases the hydraulic pressure to the predetermined second specified value pa2 after increasing the hydraulic pressure to the predetermined first specified value pa1 in the air bleeding mode.

According to this configuration, it is possible to minimize the drive load of the clutch actuator 50 because the hydraulic pressure of the hydraulic circuit 63 is increased to the first specified value pa1 and then decreased to the second specified value pa2.

In the clutch control device 60A, the clutch actuator 50 stops an increase in the pressure when the hydraulic pressure has not increased to the first specified value pa1 within the predetermined specified time period ta1 in the air bleeding mode.

According to this configuration, it is possible to minimize the overload of the clutch actuator 50 because an increase in the pressure by the clutch actuator 50 is stopped on the assumption that there is trapping of air within the hydraulic circuit 63 when the hydraulic pressure of the hydraulic circuit 63 has not increased to the first specified value pa1.

In the clutch control device 60A, the control mode changeover switch 59 can switch the control mode of the ECU 60 to the air bleeding completion check mode.

According to this configuration, after the air bleeding operation is performed according to the air bleeding mode, the control mode is switched to the air bleeding completion check mode and it is checked whether or not the air bleeding has been completed, so that the completion of the air bleeding can also be determined regardless of an operation on the clutch lever 4b in a clutch-by-wire system in which the clutch actuator 50 is interposed in the hydraulic circuit 63.

In the clutch control device 60A, the ECU 60 determines completion of air bleeding when the hydraulic pressure has increased from the predetermined first determination value pb1 to the predetermined second determination value pb2 within the predetermined check determination time period tb1 in the air bleeding completion check mode.

According to this configuration, the presence or absence of a delay of an increase in the hydraulic pressure due to trapping of air is determined according to whether or not the hydraulic pressure has passed through a hydraulic pressure area from the first determination value pill to the second determination value pb2 within the predetermined check determination time period tb1. Thereby, it is possible to determine the completion of air bleeding regardless of the feeling of the operation on the clutch lever 4b.

The present invention is not limited to the above-described embodiment. For example, the present invention is not limited to the application to a configuration in which the clutch is connected by increasing the hydraulic pressure and the clutch is disconnected by decreasing the hydraulic pressure. The present invention may be applied to a configuration in which the clutch is disconnected by increasing the hydraulic pressure and the clutch is connected by decreasing the hydraulic pressure.

The clutch operating element is not limited to the clutch lever 4b and a clutch pedal or various other operating elements may be used as the clutch operating element.

The application is not limited to a saddle-riding type vehicle in which the clutch operation is automated as in the above-described embodiment. The present invention can also be applied to a saddle-riding type vehicle including a so-called clutch operation-less transmission device configured to enable a shift by adjusting a driving force without performing the manual clutch operation under predetermined conditions while a manual clutch operation is basically performed.

In addition to the clutch-by-wire system, for example, the present invention can also be applied to a hydraulic equipment control device that drives and controls hydraulic equipment other than the clutch, such as a brake-by-wire system, via an actuator.

That is, the present invention provides the hydraulic equipment control device 60A including: the hydraulic equipment 26 configured to be operated with a hydraulic pressure which is supplied; the actuator 50 configured to supply the hydraulic pressure to the hydraulic equipment 26 and operate the hydraulic equipment 26; the hydraulic circuit 63 provided between the hydraulic equipment 26 and the actuator 50; the air bleeding device 64 configured to perform air bleeding of the hydraulic circuit 63; the ECU 60 configured to control an amount of hydraulic pressure supply from the actuator 50; the control mode changeover switch 59 configured to enable a control mode of the ECU 60 to be switched to an air bleeding mode; and the boost switch 65 configured to enable the hydraulic pressure of the hydraulic circuit 63 to increase when the control mode has been switched to the air bleeding mode.

Also, the above-described saddle-riding type vehicle includes all vehicles in which the driver rides across the vehicle body and includes not only motorcycles (including motorized bicycles and scooter type vehicles) but also three-wheeled vehicles (including vehicles with one front wheel and two rear wheels and vehicles with two front wheels and one rear wheel) or four-wheeled vehicles and vehicles including an electric motor as a motor.

The configuration in the above-described embodiment is an example of the present invention and various modifications can be made without departing from the spirit of the present invention.

BRIEF DESCRIPTION OF THE REFERENCE SYMBOLS

1: Motorcycle (saddle-riding type vehicle)
13: Engine
21: Transmission
26: Clutch device (hydraulic equipment)
50: Clutch actuator (actuator)
59: Clutch control mode changeover switch (control mode changeover switch)
60: ECU (control unit)
60A: Clutch control device (hydraulic equipment control device)
63: Hydraulic circuit
64: Air bleeding device
65: Air bleeding switch (boost switch)
66: Buck switch
pa1: First specified value
pa2: Second specified value
pb1: First determination value
pb2: Second determination value
ta1: Specified time period
tb1: Check determination time period

The invention claimed is:

1. A clutch control device comprising:
an engine;
a transmission;
a clutch device configured to connect and disconnect motive power transmission between the engine and the transmission;
a clutch actuator configured to drive the clutch device and change a clutch capacity;
a hydraulic circuit provided between the clutch device and the clutch actuator;
an air bleeding device, comprising an air bleeding port, configured to perform air bleeding of the hydraulic circuit;
a control unit configured to calculate a control target value of the clutch capacity;
a control mode changeover switch, comprising a handle switch, configured to enable a control mode of the control unit to be switched to an air bleeding mode; and
an air bleeding switch, comprising a push-type button, configured to enable a hydraulic pressure of the hydraulic circuit to increase in the air bleeding mode.

2. The clutch control device according to claim 1, wherein the clutch actuator maintains the hydraulic pressure after increasing the hydraulic pressure to a predetermined hydraulic pressure in the air bleeding mode.

3. The clutch control device according to claim 2, wherein the control mode changeover switch enables the control mode of the control unit to be switched to an air bleeding completion check mode.

4. The clutch control device according to claim 3, wherein the control unit determines completion of air bleeding when the hydraulic pressure has increased from a predetermined first determination value to a predetermined second determination value within a predetermined check determination time period in the air bleeding completion check mode.

5. The clutch control device according to claim 2, wherein the clutch actuator decreases the hydraulic pressure to a predetermined second specified value after increasing the hydraulic pressure to a predetermined first specified value in the air bleeding mode.

6. The clutch control device according to claim 5, wherein the control mode changeover switch enables the control mode of the control unit to be switched to an air bleeding completion check mode.

7. The clutch control device according to claim 6, wherein the control unit determines completion of air bleeding when the hydraulic pressure has increased from a predetermined first determination value to a predetermined second determination value within a predetermined check determination time period in the air bleeding completion check mode.

8. The clutch control device according to claim 1, wherein the control mode changeover switch enables the control mode of the control unit to be switched to an air bleeding completion check mode.

9. The clutch control device according to claim 8, wherein the control unit determines completion of air bleeding when the hydraulic pressure has increased from a predetermined first determination value to a predetermined second determination value within a predetermined check determination time period in the air bleeding completion check mode.

10. The clutch control device according to claim 1, wherein the clutch actuator stops an increase in pressure when the hydraulic pressure has not increased to a predetermined first specified value within a predetermined specified time period in the air bleeding mode.

* * * * *